J. H. LITTLER.
VARIABLE SPEED CLUTCH PULLEY.
APPLICATION FILED JUNE 19, 1919.
1,330,080.
Patented Feb. 10, 1920.
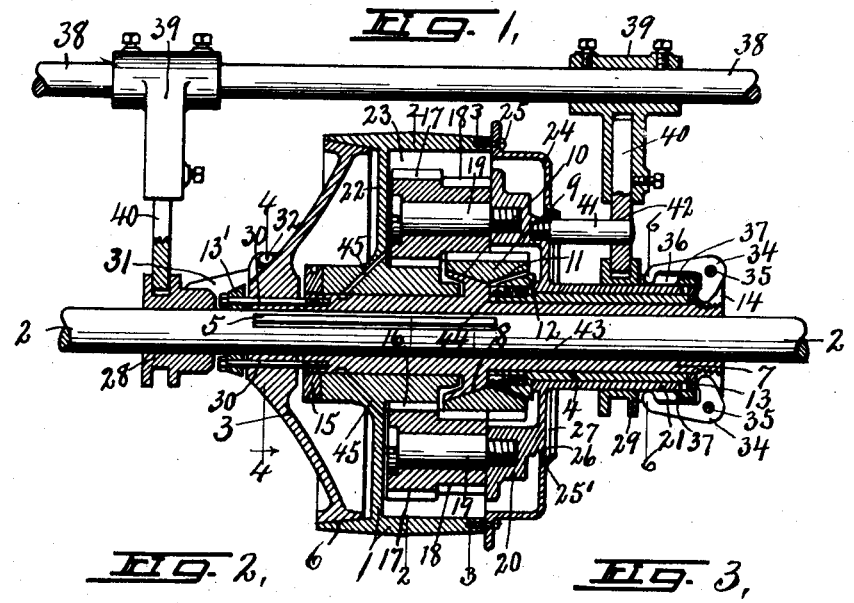
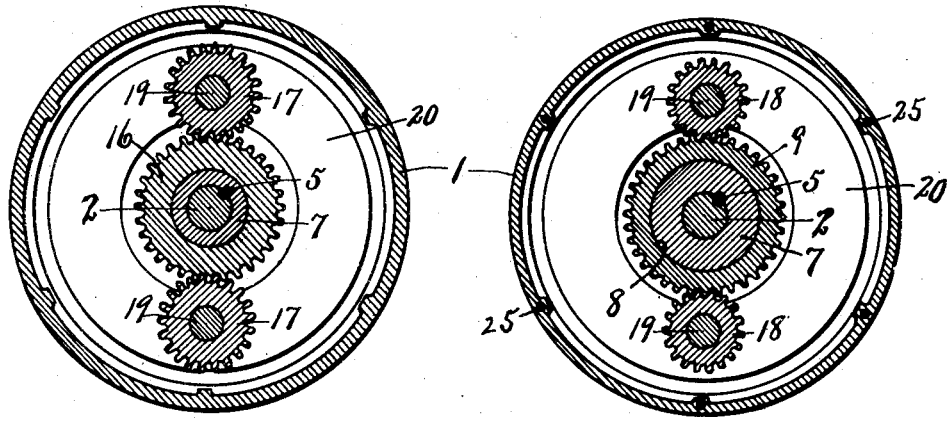
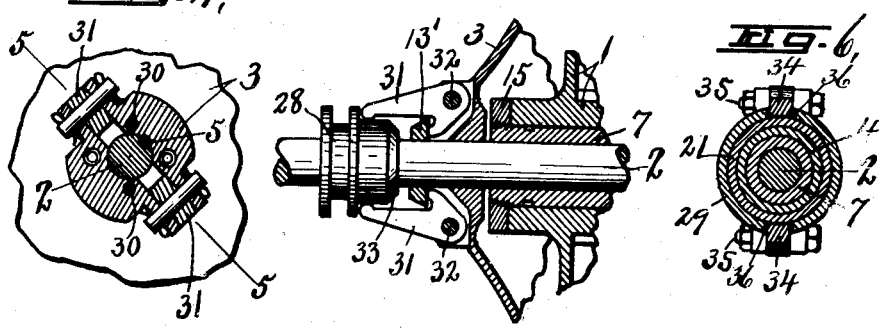
INVENTOR
J. H. Littler
BY Howard P. Denison
ATTORNEY.

UNITED STATES PATENT OFFICE.

JAMES H. LITTLER, OF MANLIUS, NEW YORK, ASSIGNOR TO S. CHENEY & SON, OF MANLIUS, NEW YORK, A CORPORATION OF NEW YORK.

VARIABLE-SPEED CLUTCH-PULLEY.

1,330,080.  Specification of Letters Patent.  Patented Feb. 10, 1920.

Application filed June 19, 1919. Serial No. 305,270.

*To all whom it may concern:*

Be it known that I, JAMES H. LITTLER, a citizen of the United States of America, and resident of Manlius, in the county of Onondaga, in the State of New York, have invented new and useful Improvements in Variable-Speed Clutch-Pulleys, of which the following, taken in connection with the accompanying drawings, is a full, clear, and exact description.

This invention relates to certain improvements in variable speed clutch pulleys or power transmitting mechanism involving the use of a continuously rotating driving element such as a pulley, a driven element coaxial with the driving element, and means including clutch members and gearing for transmitting motion from the driving element to the driven element to cause the latter to be rotated at different speeds or to remain at rest at the will of the operator.

I am aware that various devices employing planetary gearing have heretofore been proposed for accomplishing a similar result, and while it is true that a planetary gearing may be practicable, it is well known that it is extremely noisy and absorbs considerable power in overcoming its inertia; and one of the objects of my present invention is to avoid the objectionable features of a planetary gearing in devices of this character by keeping the axes of the idler pinions in a fixed position against angular movement about the axis of and relatively to the driving and driven elements, and to control at least one speed and the stopping of the driven element through the medium of what may be termed a "floating gear" and a suitable clutch member under the control of the operator coacting therewith.

A further object is to inclose the entire system of gearing within a suitable oil containing housing of which the driving element forms a part, and to provide suitable passages for the distribution of oil from said housing to the bearings of the relatively rotatable parts.

Other objects and uses relating to specific parts of the device will be brought out in the following description:

In the drawings,—

Figure 1 is a longitudinal sectional view, partly in elevation, of a variable speed power transmitting device embodying the various features of my invention.

Figs. 2, 3, and 4 are transverse sectional views taken respectively in the planes of lines 2—2, 3—3 and 4—4 Fig. 1.

Fig. 5 is a longitudinal detail sectional view taken in the plane of line 5—5 Fig. 4.

Fig. 6 is a transverse sectional view taken in the plane of line 6—6 Fig. 1.

As illustrated, this device comprises a rotary driving element such as a pulley —1—, a rotary driven element consisting of a shaft —2— coaxial with the driving element, a clutch member —3— also coaxial with the driving element and movable into and out of engagement with the adjacent end of the pulley —1— for transmitting rotary motion directly from said pulley to the shaft —2— whereby the latter will be driven at the same speed as the pulley, and suitable gearing, and an additional clutch member —4— for transmitting motion from the pulley to the shaft at a different speed hereinafter more fully described.

The clutch member —3— is feathered or splined upon the shaft —2— by means of a key —5— for axial movement along said shaft and is provided with a conical periphery movable into and out of frictional engagement with a corresponding bearing —6— on the adjacent end of the pulley so that when engaged therewith, the shaft —2— will be driven at the same speed as the pulley —1—.

Encircling the shaft —2— at the inner end of the hub of the clutch member —3— is a sleeve —7— which is secured to said shaft by the key —5— to rotate therewith, a portion of the sleeve intermediate its ends being enlarged and provided with a conical bearing —8— tapered in the same direction as the periphery of the clutch member —3— for receiving and supporting what may be termed a "floating gear —9—."

The inner face of this floating gear is tapered inwardly from both ends to form annular cone bearings —10— and —11— for engagement respectively with the bearing —8— on the sleeve —7—, and a conical bearing —12— on the inner end of the clutch member —4— when the latter is shifted into engagement therewith in a manner presently described.

The clutch member —4— encircles the adjacent portion of the sleeve —7— and has a limited endwise sliding movement thereon between the annular enlargement —8— and an end thrust hardened bearing disk —13— which is also slidably mounted upon the outer end of the sleeve —7— and is held against endwise displacement by an internally threaded collar or nut —14— on the adjacent end of said sleeve.

The pulley —1— is journaled upon the sleeve —7— at one end of the enlargement —8— opposite that at which the clutch —4— is located, and is held against axial displacement by a threaded collar or nut —15— engaging the adjacent end of said sleeve.

The inner end of the hub of the pulley —1— is preferably reduced in diameter while the adjacent end of the annular enlargement —8— is recessed to receive said reduced end thereby allowing the conical bearing of the enlargement —8— to overhang the adjacent end of the hub so that the floating gear may be brought into closer relation to the driving gear on the pulley and at the same time permitting the use of relatively long conical bearings —8—, —10— and —11—.

The inner end of the hub of the pulley —1— is provided with a spur gear —16— meshing with diametrically opposite pinions —17— each of which is formed integral with a coaxial companion pinion —18— of different diameter, (in this instance reduced) said pinions —18— meshing with diametrically opposite sides of the floating gear —9—.

The companion gears —17— and —18— are journaled upon suitable studs or bearings —19— which in turn are secured to a suitable supporting head —20— having a circular hub —21— journaled upon the reduced portion of the clutch member —4— between its annular enlargement —12— and the end thrust bearing —13— with just sufficient clearance between the outer end of said hub and the end thrust bearing to permit the clutch member —4— to be moved axially into and out of frictional engagement with the corresponding clutch face —11— of the floating gear —9—.

The gears —16—, —17—, —18—, and —9— are at least partially surrounded by the rim of the pulley —1— between its web as —22— and the head —20—, said web and rim of the pulley being preferably imperforate to form the main portion of an oil chamber —23—, the open side of which is closed by a cap —24— which is secured by screws —25— to the adjacent end of the rim of the pulley —1—.

The outer end of the cap —24— is formed with a circular opening through which the corresponding ends of the parts —4—, —7— and —21— may project, the walls of said opening constituting an annular bearing —25'— coöperating with a peripheral annual bearing —26— on the part —20— to form an oil tight running joint therewith so that a considerable quantity of oil may be retained in the chamber —23— for lubricating purposes.

The wall —25'— is also provided with an annular groove —27— for collecting any slight amount of oil which may pass through the joint, although in practice, when the parts within the oil chamber are revolving, the tendency is to draw the oil away from this joint into the chamber presumably by reason of suction which may be produced therein by the revolving parts or by the centrifugal movement of the oil.

An end thrust bearing disk or washer —13'— at the outer end of the hub of the clutch member —3— is connected by bolts —30— through said hub to the adjacent end of the sleeve —7— to form an abutment for the shorter arms of a pair of diametrically opposite bell crank levers —31— which are pivoted at —32— to the hub of the clutch member —3— and have their longer arms movable upon and along corresponding faces of the adjacent collar —28—, the inner end of which is beveled at —33— to enable the longer arms of the bell crank levers to ride upon the periphery of the main body of the collar as the latter is shifted axially into and out of engagement with the bell crank levers for forcing the clutch member —3— into and out of engagement with the pulley —1—.

A pair of similar bell crank levers —34— are pivoted at —35— to diametrically opposite sides of the collar —14— and have their shorter arms bearing upon the outer end face of the thrust disk —13— and their longer arms adapted to ride in the lengthwise slots —36— in the hub of the collar —29—.

The outer end walls of the slots —36— are beveled at —37— to allow the longer arms of the bell crank levers —34— to ride easily upon the periphery of the hub of the collar —29— for forcing the clutch member —4— into and out of engagement with the conical bearing face —11— of the floating gear —9—, and incidentally forcing said floating gear into frictional engagement with the clutch face —8— of the sleeve —7—.

A shifting rod —38— operable at will is provided with longitudinally adjustable clamping members —39— having radially adjustable fork arms —40— engaged with the circumferentially grooved collars —28— and —29— respectively for simultaneously shifting said collars axially in one direction or the other and thereby effecting a corresponding movement of their respective clutch members —3— and —4—, the same device being employed to shift the clutch members to their neutral positions.

The head —20— and pinions —17— and —18— mounted thereon are held against angular movement about the axis of the shaft —2— by a stud —41— engaging in an aperture —42— in the adjacent shifting arm —40—, it being understood that the shifting rod —38— is adapted to be mounted in any fixed supports (not shown) to hold it in parallelism with the shaft —2— and in a fixed plane radial thereto.

The inner end of the clutch member —4— is provided with diametrically opposite lengthwise sockets for receiving relatively light coil springs —43— and plungers —44— which are forced into frictional engagement with the adjacent end face of the enlarged portion —8— of the sleeve —7— under the pressure of said springs and assists in disengaging the clutch member —4— from the floating gear —9— when the rod —38— is shifted to release said clutch member.

Suitable oil passages —45— lead from the chamber —23— to the bearing for the pulley —1— upon the sleeve —7— which is provided with an annular groove registering with said passages to facilitate the distribution of the oil along said bearing.

*Operation.*

Assuming that the parts are in a position shown as in Fig. 1 in which the clutch member —3— is engaged with the pulley —1— for driving the shaft —2— at the same speed as that of the pulley, and that the clutch member —4— is disengaged from the floating gear —9— under which conditions the pinions —17— and —18— and floating gear —9— will run idly upon their respective bearings 19— and —8—.

Now, if the speed of the shaft —2— is to be changed, it becomes necessary to shift the rod —38— from the position shown in Fig. 1 to disengage the clutch member —3— from the pulley and to successively engage the clutch member —4— with the floating gear —9— with sufficient force to frictionally engage said floating gear with the conical bearing —8— on the sleeve —7— thereby frictionally locking the floating gear —9— to said sleeve and causing the shaft —2— to be driven at a different (in this instance a reduced) speed.

Shifting the rod —38— to an intermediate position will disengage both of the clutch members —3— and —4— from their companion clutch faces —6'— and —11— thereby causing the pulley to rotate independently of the clutch member —3— and allowing the floating gear —9— to revolve independently of its clutch member —4— and sleeve —7— during which operation the shaft —2— will remain at rest.

This device is practically noiseless when the shaft —2— is driven at either speed when the pulley is running idle, and when a sufficient quantity of oil is placed in the chamber —23— for lubricating purposes, it will last a considerable period of time or as in actual use about six months without re-oiling and at the same time is very compact, may be applied to any shaft, and is extremely economical in manufacture and installation.

What I claim is:

1. In combination with a rotary driving element having a clutch face, a rotary driven element coaxial with the driving element and also provided with a clutch face, a clutch member movable into and out of engagement with the clutch face of the driving element, a floating member revoluble on the clutch face of the driven element and provided with a clutch face, a separate clutch member movable into and out of engagement with the clutch face of the floating member, means for transmitting motion from the driving element to the floating member, and means for shifting the clutch members.

2. In combination with a revoluble driving element, and a coaxial revoluble driven element, said driven element having a cone bearing, a floating member rotatable on said bearing and having a slight axial movement for wedging coaction therewith to frictionally lock the two parts together, means for transmitting motion from the driving element to said floating member, and means operable at will for causing said wedging action between said floating member and driven element.

3. In combination with a continuously rotating driving element, a rotary driven element having an annular bearing, a floating member rotatable on said bearing and having wedging coaction therewith by axial movement, means for transmitting rotary motion from the driving element to said member, and means for moving said member axially to frictionally lock it to the driven element.

4. In combination with a rotary driving element having a cone bearing, a rotary driven element coaxial with the driving element and also provided with a cone bearing, a clutch member movable into and out of engagement with the cone bearing of the driving element, a floating member rotatable upon the cone bearing of the driven element and having wedging coaction therewith by axial movement, means for transmitting rotary motion from the driving element to said floating member, and means for moving the floating member axially to cause it to frictionally interlock with the cone bearing of the driven element.

5. In combination with a continuously rotating pulley having one end provided with a cone bearing, a driven element coaxial with the pulley and also provided with a cone bearing, a floating gear rotatable upon the cone bearing of the driven element and having wedging coaction therewith by axial movement in one direction to frictionally lock the two parts together, gears for transmitting rotary motion from the pulley to the floating gear, and means operable at will for causing said axial movement of the floating member.

6. In combination with a continuously rotating pulley having one end provided with a cone face, a head at the opposite end of the pulley coaxial therewith, means for preventing the rotation of said head, a gear on the pulley, a rotary driven member coaxial with the pulley and provided with a cone bearing, a floating gear rotatable on said bearing and having wedging coaction therewith by axial movement in one direction, pinions mounted on said head and meshing with the gear on the pulley and with the floating gear for transmitting motion from the pulley to the floating gear, a clutch member movable into and out of engagement with the clutch face of the pulley, and means operable at will for causing said axial movement of the floating member.

7. In combination with a continuously rotating pulley having one end provided with a cone face, a head at the opposite end of the pulley coaxial therewith, means for preventing the rotation of said head, a gear on the pulley, a rotary driven member coaxial with the pulley and provided with a cone bearing, a floating gear rotatable on said bearing and having wedging coaction therewith by axial movement in one direction, pinions mounted on said head and meshing with the gear on the pulley and with the floating gear for transmitting motion from the pulley to the floating gear, a clutch member movable into and out of engagement with the clutch face of the pulley, and means operable at will for causing said axial movement of the floating member, and a cap secured to the end of the pulley opposite that provided with the cone bearing face and having a tight running joint with a portion of said head, said cap forming with the pulley an oil chamber containing the gears and pinions.

In witness whereof I have hereunto set my hand this 10th day of June 1919.

JAMES H. LITTLER.

Witnesses:
JOHN P. CHENEY,
FRED M. BARNUM.